(12) United States Patent
Cobbett et al.

(10) Patent No.: US 6,775,366 B1
(45) Date of Patent: Aug. 10, 2004

(54) SYSTEM AND METHOD FOR ADDING INTERNET FUNCTIONALITY TO A TELEPHONE CALL

(75) Inventors: Michael Cobbett, Eastleigh (GB); Paul Andrew Duffin, Waterlooville (GB); Raymond Jepson, Eastleigh (GB); Samuel Smith, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 09/625,338

(22) Filed: Jul. 25, 2000

(30) Foreign Application Priority Data

Sep. 18, 1999 (GB) .............................................. 9922022

(51) Int. Cl.[7] .................................................. H04M 3/42
(52) U.S. Cl. ............................. 379/201.02; 379/88.17; 379/88.19; 379/142.06; 379/201.03; 379/265.09
(58) Field of Search .......................... 379/88.17, 88.19, 379/88.2, 88.21, 207.14, 207.15, 265.09, 900, 142.06, 201.02, 201.03

(56) References Cited

U.S. PATENT DOCUMENTS

| | | | | |
|---|---|---|---|---|
| 5,805,587 A | * | 9/1998 | Norris et al. ................ | 370/352 |
| 6,101,246 A | * | 8/2000 | Heinmiller et al. ..... | 379/142.01 |
| 6,130,933 A | * | 10/2000 | Miloslavsky .............. | 379/90.01 |
| 6,169,795 B1 | * | 1/2001 | Dunn et al. ............ | 379/209.01 |
| 6,292,479 B1 | * | 9/2001 | Bartholomew et al. ..... | 370/352 |
| 6,304,565 B1 | * | 10/2001 | Ramamurthy ................ | 370/352 |
| 6,587,458 B1 | * | 7/2003 | Burg et al. .................. | 370/356 |

FOREIGN PATENT DOCUMENTS

| | | |
|---|---|---|
| GB | 2 309 615 | 7/1997 |
| WO | WO 98/07266 | 2/1998 |
| WO | WO 98/19445 | 5/1998 |

* cited by examiner

*Primary Examiner*—Bing Bui
(74) *Attorney, Agent, or Firm*—Jerry W. Herndon

(57) ABSTRACT

A system for adding internet functionality to a telephone call between a first caller and a second caller. The system comprises a telephony application, responsive to receiving a source telephone number associated with the first caller and a destination telephone number associated with the second caller, for extracting the numbers. A first query is constructed using the source number to access details relating to the first caller and a second query is constructed using the destination number to access details relating to the second caller. An internet related function is then performed in accordance with these details. The internet related function may be to record a telephone conversation and email it to the callers, or to email call or caller details to each of the callers, or to exchange files, such as word processing documents and images etc.

18 Claims, 1 Drawing Sheet

SYSTEM AND METHOD FOR ADDING INTERNET FUNCTIONALITY TO A TELEPHONE CALL

BACKGROUND OF THE INVENTION

1. Field of the Invention

The invention relates to adding internet functionality to a telephone call.

2. Description of the Related Art

Every day thousands of telephone calls are made across the world. Frequently, the calling and called parties participating in such a call will only know the bare minimum about each other. This may comprise the name and phone number alone. It is therefore extremely likely that during the course of a telephone conversation additional personal details will need to be exchanged. For example, it may be necessary for either or both parties to exchange home and business addresses. Typically one party communicates these details to the other, who writes them down onto paper or enters them into a computer database. There is no guarantee however that this information will be scribed accurately. Pronunciation may hinder the person taking down the information and certain words may need to be spelt out. This process can be time consuming if there is a large amount of information to be exchanged and especially if information needs to be exchanged in both directions. This exchange thus encroaches upon the conversation under way. Furthermore, if scribed onto paper, the information is easily mislaid unless properly stored away. Typically a recipient of such information will therefore organise it into a useful format. This may involve, for example, entering the information into an electronic contacts database. Again this takes time and it is quite likely that mistakes will be introduced during the transferral process.

On a grander scale, certain organisations, for example insurance operators, spend hours on the phone taking down customers' details. The more information required the longer a single call will take. Other callers are frequently frustrated at having to wait many minutes in a queue before getting through to an operator. Clients also become frustrated at having to give the same information out time and time again to different companies.

It is not only personal details and other "established" data that a caller may wish to record. During a telephone conversation a detailed discussion of one topic or another may take place. If a caller wants a record of this then they are required to take notes whilst on the phone. This too can hold up proceedings and again there is no guarantee that the information will be accurately scribed. Furthermore, when a caller is misquoted on an important issue, they have no concrete proof that an injustice has been committed.

In addition to this, callers may wish to receive from or transmit to the other participant in the telephone call certain documents. These either have to be sent via post and there is a delay of a few days before they are received or have to be emailed. Either way, this is a separate process which has to be carried out. There is no automation involved.

The Direct Talk Voicemail system, available from IBM, connected to a Hicom switch from Siemens Corp, is cooperable with Lotus Notes—IBM's email system to provide an IBM employee with details of callers who leave them a voicemail message. No details are supplied if a caller gets through to the person at the other end. Furthermore, the system does not cater for calls from external callers. It informs you that you were called by such a caller and gives the time at which the message was left, but no more. In addition, no provision is made for swapping details in the opposite direction. In other words, for providing the calling person with details of the person they called.

U.S. patent application Ser. No. 5,592,538, issued Jan. 7 1997, discloses a telecommunications device permitting mixed voice and data communication during a single telephone call. The invention may be practised either by installing a plug-in module and special software within a personal computer (PC) or via a stand-alone device comprising a display, modem chip, user interface etc. If the former is implemented then each telephone has to be connected to an up and running PC. With the latter, participants have to invest in new telephony equipment. Furthermore, data transfer has to be manually initiated at either end and temporarily interrupts voice The data for transferral is stored locally at each end and may therefore be subject to less stringent backup procedures.

SUMMARY OF THE INVENTION

Accordingly, the invention provides a system according to claim 1.

In a further aspect, the invention provides a method according to claim 17.

According to the preferred embodiment, a telephone conversation may take place as normal with the exchange/receipt of information via the Internet being both an automatic and transparent process. Calls may originate/terminate in any country all over the world. Callers subscribe to certain options regarding the type of information they wish to send/receive. They may for example, wish to exchange personal details with a caller at the other end. The conversation is not interrupted in order to exchange this information. The information sits on an Internet Service Provider's (ISP) server and can be transmitted time and time again to those parties who wish to receive it. There is less likelihood of the information being corrupted since it is stored centrally and since the backup procedures are likely to be more stringent than those of an ordinary user. Time is not wasted providing the same information on countless occasions over the phone. Telephone conversations may be shorter and more focused. Organisations can deal with more customers and don't keep people waiting to be served for nearly so long. Furthermore, callers do not manually have to make a note of the information being exchanged. A first caller may receive information from a second caller and vice versa in the form of an email. Errors are no longer introduced as a result of mistakes made when taking down the information. Pronunciation is no longer a problem and words do not need to be spelt out. The information may be easily transferred to a database or stored away in an email notelog for future retrieval. Information is much less likely to be mislaid.

It will be seen that in using the invention any information may be exchanged. Callers may transfer files to one another, including images, word processing documents, executable programs etc. For example, a caller may like to know what the person they are talking to looks like and therefore subscribe to receive the image of any person they call who has made such an image available for transmission.

Organisations may wish to automatically transfer files to customers/potential customers. For example a mail-order company may want to automatically send to all callers who are not on their mailing list their catalogue. This could be transmitted straight to the caller's mail box via email.

Preferably, all information may be encrypted in order to provide for the transmission of private data. For example, a financial institution may wish to receive account details, credit card numbers, account passwords etc. If a caller chooses to send them this information, they can be happy in the knowledge that this is will be securely transmitted.

It is also possible for a caller to request that all their telephone calls be automatically recorded and either deposited as a sound file or converted to text and deposited as a text file in their mail box. It is therefore, no longer necessary for them to take notes during a telephone conversation. Furthermore, individuals can no longer misquote callers who subscribe to this option. Such callers possess a copy of the call as proof of what was discussed.

BRIEF DESCRIPTION OF THE DRAWING

A preferred embodiment of the present invention will be described in detail, by way of example only, with reference to the accompanying drawing, which is a schematic block diagram of the components of the invention according to a preferred embodiment.

DETAILED DESCRIPTION

Figure 1:
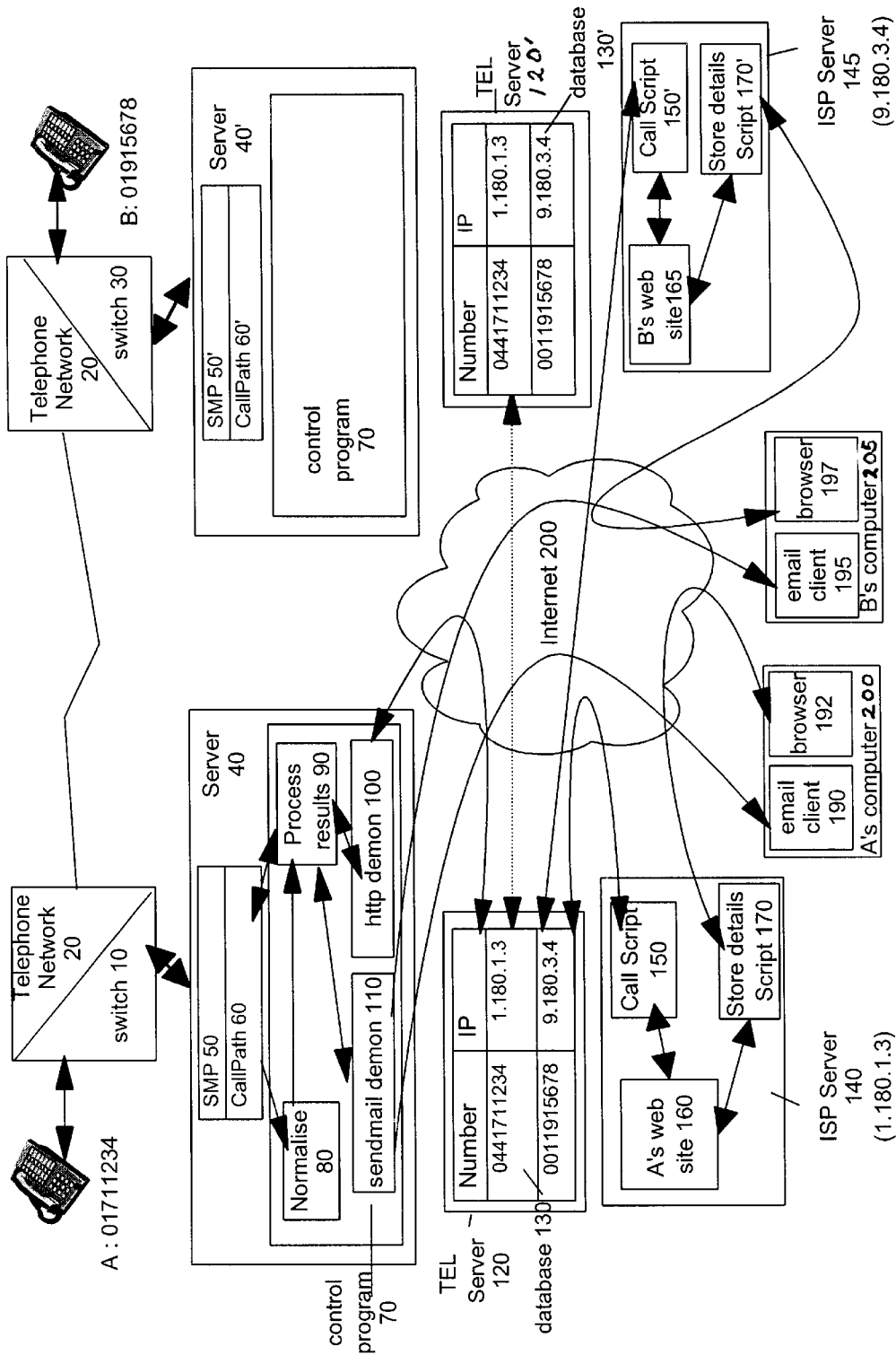

With reference to the FIGURE, according to the preferred embodiment a user of a first telephone A places a call to a second telephone B. By way of example, telephone A has a telephone number of "01711234" and is located in the United Kingdom, whilst telephone B has a telephone number of "01915678" and is located in the United States (US). Note, both telephones may be located in the same country. Telephone A is attached to a local switch 10 via appropriate hardware and this switch 10 forms part of the telephone network 20. Source and destination telephone numbers sent by telephone A are intercepted by this switch which runs software (not shown) to extract the destination number (ie the number associated with telephone B). The switch 10 uses this to route the call via the telephone network to B's local switch 30 that also forms part of this network. Telephone B is attached to switch via appropriate hardware. (Note, one or both switches may be either privately or publicly owned.) The software running on A's local switch 10 also extracts the source number (ie the number associated with telephone A) and uses this along with the destination number to generate billing information which will later be sent to A for payment. Software (not shown) running on B's local switch 30 extracts the destination number so that it can ring telephone B. It may also extract the source number so that it can present this to B and they can identify who is making the call. The processing of a normal telephone call is well known in the art and will therefore not be discussed in any more detail.

In the preferred embodiment, switch 10 is further attached to a server 40, which may for example be from the IBM RISC 6000 family. The server runs a telephony application 60, such as CallPath (available from the IBM Corporation), which uses a switch mapping protocol 50 (SMP) to connect to switch 10. A packet of information (not shown) containing the source and destination numbers is transmitted via this link from the switch to the server and this information is extracted by the CallPath application 60. A control program 70 also runs on the server and comprises a Normalise function 80. This receives both the source and destination numbers from application 60 and ensures that each number is of a unique format. This is done by adding the country code to each number and removing the first zero from the area code. In the example B's number is already normalised at the point of extraction to enable the call to be correctly routed through to the US. A's number, 01711234, on the other hand is extracted as exactly that since A is calling from the UK and the switch 10 is hence local. A's number is therefore normalised to 0441711234. Note, if both A and B were based in the same country then the normalise function would detect this and normalise both numbers. Alternatively, it would be possible to remove the country code and add the first zero of the area code to an international destination numbers. However, this would require each telephone number to be associated with a country code attribute in order to ensure their uniqueness.

The control program further comprises a process results function 90. This receives the normalised source and destination numbers from function 80 and constructs a URL for each. An http demon 100, connected to the Internet 200 by a TCPIP link, also resides within, or is available to, the control program and function 90 transmits the URLs to this demon and receives responses from it. In the example, the URL associated with A is first transmitted to demon 100.

Server 40 is associated with a TEL server 120 via the Internet. The TEL server has a domain name of the form www.<teldomainserver-name>.tel and its operation is analogous to that of an Internet domain name server (DNS) which provides a URL to IP address mapping. The TEL server on the other hand comprises a service subscribers' database 130 of telephone number to IP address mappings. Each IP address denotes the address of an Internet Service Provider (ISP) server where a call participant's web site is stored.

Server 40 is aware of its local TEL Server 120 and in the example, server 120 is maintained by British Telecom (BT). It is responsible for receiving an HTTPGET request comprising A's URL from the http demon. The URL is of the form "http://www.BT.tel" with A's telephone number passed in as a parameter. A's phone number, 0441711234 maps to IP address 1.180.1.3 and the TEL server relays the request on to the Internet Service Provider's (ISP) Server (also attached to the Internet) addressed by this IP address on which A's details are stored on web site 160.

Note, whenever a new subscriber's web site is constructed, its address is registered with its local TEL Server (in A's example, server 120). All TEL Servers can communicate with one another and hence this information is replicated through to the other TEL Servers. Thus in the example server 120 replicates the information through to server 120'. Thus if B initiates a telephone call then HTTPGET requests can be routed through from its local server 40' to the server's local TEL server 120'.

A's web site of details 160 comprises a plurality of subscriber preferences, including email address, and A's personal details. A plurality of cgi scripts 150 also sit on ISP server 140 and interact with A's web site 160 to retrieve information. According to the preferred embodiment these comprise:

i) preferences.cgi
  ii) getdetails.cgi
  iii) getimage.cgi

Responsive to a call being placed, the first URL received from the http demon is used to call the cgi script, preferences.cgi. A's telephone number is passed in as a parameter to this script to enable the script to access the correct subscriber's site. This is because according to the preferred embodiment, an ISP Server 140 comprises a plurality of subscriber web sites (one shown). The URL to enable all of this looks as follows:

http://www.BT.tel/<cgiscript>.cgi&<source-number>.

Since the cgi script 150 is named"preferences.cgi", the URL constructed in this instance for A is http://www.BT.tel/preferences.cgi&0441711234.

Preferences.cgi 150 accesses the preferences stored within the site to determine the features of the service provided by the preferred embodiment that A wishes to use. The preferences might include amongst others:

i) Record telephone conversation ii) Exchange and receive personal details iii) Transmit certain files—eg bank/insurance form details iv) Receive picture of a caller v) Receive files—eg catalogues These preferences, including A's email address, are routed back via the TEL server 120 and the http demon 100 to the process results function 90.

The process results function 90 then transmits the URL associated with B to demon 100. This takes on a similar format to that of A's but this time passes in B's telephone number as a parameter: http://www.BT.tel/call.cgi&0011915678. This URL is transmitted to the http demon 100 and this then routes an HTTPGET request to the TEL server 120. The IP address associated with the server 145 is once again discovered via the database sitting on the TEL server 120. Here B's telephone number maps to IP address 9.180.3.4, and so the URL is routed to the ISP server 145 responsible for storing B's web site 165.

The TEL server 120 communicates with the ISP server 145 to call the cgi script, preferences.cgi 150', running on B's ISP server 145 and this uses B's telephone number parameter (0011915678) to access B's web site. Preferences.cgi accesses the preferences stored within B's site to determine the features of the service provided by the preferred embodiment that B wishes to use. These too, including B's email address, are returned via the TEL server 120 to the http demon 100 and finally to the process results function 90.

The process results function 90 then compares A and B's preferences to determine whether they are compatible with one another. If for example A has subscribed to exchange personal details but B does not want to receive these details then the process results function operates in accordance with this. However, if both sets of preferences are compatible, then function 90 processes them. For example, if both A and B have subscribed to exchange personal details then the process results function sends a first request to retrieve A's details to the http demon 100 and a second request to retrieve B's details.

The first request is routed from the http demon 100 via the TEL server 120 to ISP Server 140 and A's information is retrieved by another of the plurality of cgi scripts, getdetails.cgi, running on ISP server 140. Note, there is a separate cgi script for each service to which a user might subscribe. For example, if callers are exchanging pictures of one another, the getimage.cgi is called.

The information is returned to the TEL server 120 and is then transmitted by the http demon 100 to the process results function 90. The second request is dealt with similarly. Function 90 then constructs two emails. The first email comprises A's personal details and the second email comprises B's personal details. A's email address is entered into the To: field of the second email and B's email address is entered into the To: field of the first email. The process results function then transmits both emails to a sendmail demon 110 also running on server 40. This sendmail demon connects to the Internet and transmits the emails across the Internet to a mail server (not shown) where they may then be retrieved at the convenience of the addressees.

Also attached to the Internet are two additional computers 200, 205. One computer 200 is associated with A and runs an e-mail client 190 that can, for example, be Outlook Express, available from the Microsoft Corporation. B also has a computer 205 attached to the Internet. This too runs an email client 195. The first email containing A's information may be retrieved and read via email client 195 on B's computer and the second email comprising B's information may be retrieved and read via email client 190 on A's computer. Thus A is able to receive information about B and vice versa. Both computers 200, 205 also run a browser 192, 197. The browsers are able to connect to the appropriate ISP server 140, 145 via the Internet to interact with a store details cgi script 170, 170'. Script 170 can communicate and update the information stored within A's web site and script 170' can do the same for B's web site. Note the invention is not limited to the use of cgi scripts. Scripts 170, 170' might just as easily be java applets, and scripts 150, 150' might be servlets.

A subscriber's web site may also keep track of others to whom information has been sent. The process results function 90 having determined that both A and B's preferences are compatible and that information from their web sites is to be exchanged, might relay this to another cgi script running on A's ISP server 145. The script may then update A's web site with this information. On a subsequent occasion, before deciding whether or not to email B, the process results function 90 would communicate with a further script running on A's ISP which would then check A's web site to verify that B had not received the same information from them on a previous occasion.

Instead of exchanging personal details A may wish to record the telephone conversation. The process results function 90 accesses the CallPath application to make this request. The conversation is recorded and a sound file returned to function 90. Alternatively, voice recognition software (not shown) running on an interactive voice response (IVR) product, such as or IBM's Direct Talk software in conjunction with the CallPath application, translates the conversation into text and returns this to the CallPath process results function 90. It is well known for CallPath to facilitate these kinds of operations. Either the sound or text file, as is appropriate, is then constructed into an email and sent via the sendmail demon 110 to A's mail server.

A and B's preferences need not be the same. For example, an institution such as an insurance operator may wish to receive a caller's details, whilst their customers might wish to automatically transmit their details to the operator. Subscribers to the service provided by the preferred embodiment would have their preferences set accordingly. Conversely, another institution such as a mail order company might wish to automatically transmit its catalogue to customers whose preferences indicated that they wish to receive this type of information. Furthermore, the Internet Service Provider servers 140, 145 may be managed by a telecommunications provider (eg BT) and thus a subscriber's telephone bill could reflect charges for the use of the system. For example, every time a caller received a recording of a telephone conversation they might be billed for this.

Note, B's local switch also has a server 40', connected to it via a SMP link 50'. Thus if B were to initiate a telephone call through to A, then this server may route requests via its local TEL server 120' to access both A's and B's web sites and exchange information.

Although the invention has been described in the context of a TEL server routing the http requests, the invention is not limited to such. The server 40 may comprise a database of mappings of phone numbers to URLs. Each URL would directly address a ISP server comprising a caller's web site. Alternatively, such a database may be remotely linked to server 40 and a lookup done before the request is routed straight to the ISP server. Another possibility is that a caller's web site is stored locally on the server 40 itself.

It should also be seen that, while the TEL servers have been described as relaying both URL's from their associated HTTP demons and responses from respective ISP servers, the TEL servers could be implemented simply to respond to a first request from a HTTP demon to return the subscriber's web site IP address, and thereafter the demon could contact the subscriber's web site directly without needing to further access the TEL server.

Although in the preferred embodiment a caller's web site includes its email address, this address may be stored in the same database just mentioned above. Alternatively, there may be a further database (either local to or remotely attached to server 40 comprising phone number to email address mappings.

If each subscribing caller's web site includes their telephone number in the address, then rather than know the exact address of an ISP comprising those details, a search query could be constructed and propagated across the Internet. The HTTPGET request could then be routed to the address with the highest probability identified by this query.

Finally, the invention is not limited to receiving source and destination telephone numbers from the telephone switch directly. These numbers may be received indirectly.

What is claimed is:

1. A system for adding internet functionality to a telephone call between a first caller and a second caller comprising:
   means, responsive to receiving a source telephone number associated with said first caller and a destination telephone number associated with said second caller, for extracting said numbers;
   means for constructing a first query using said source number to access details relating to the first caller;
   means for constructing a second query using said destination number to access details relating to the second caller;
   means for retrieving said first and second callers' details; and
   means for performing an internet related function while the first and second callers are connected in accordance with said details, wherein said details comprise preferences denoting the internet function to be performed.

2. The system of claim 1, further comprising means for normalising said source and destination telephone numbers to generate unique source and destination numbers.

3. The system of claim 1, comprising means for routing said first and second queries through to respective locations at which the first and second caller's details are stored.

4. The system of claim 3, wherein said routing means comprises a table including a plurality of telephone numbers, each telephone number associated with a location at which a caller's details are stored, the source telephone number included in the first query being used to determine the address of the location at which the first caller's details are stored and the destination telephone number included in the second query being used to determine the address of the location at which the second caller's details are stored.

5. The system of claim 1, further comprising means for comparing said first caller's preferences with said second caller's preferences to determine whether they are compatible with one another.

6. The system of claim 5, wherein said comparing means is responsive to said preferences being compatible to perform the internet function.

7. The system of claim 1, wherein said first caller's details further comprise information relating to said first caller and said second caller's details further comprise information relating to said second caller, said performing means comprising means for retrieving said information.

8. The system of claim 7, further comprising means for transmitting information relating to one of said first caller and second callers to the other of said first and second callers.

9. The system of claim 7, wherein said first caller is an individual and said information relating to said caller comprises financial information and said preferences relating to said first caller include a preference to transmit said financial information to a financial institution; and said second caller is a financial institution and said preferences relating to said second caller include a preference to receive said financial information.

10. The system of claim 7, wherein said second caller is an institution and said information relating to said caller comprises information relating to said institution and said preferences relating to said second caller include a preference to transmit said information; and said first caller is an individual and said preferences relating to said first caller include a preference to receive said information from an institution.

11. The system of claim 8, further comprising:
    means, responsive to determining that one of said first and second callers has not received information relating to the other of said first and second callers, for transmitting said one of said first and second caller's information to the other of said first and second callers.

12. The system of claim 8, wherein said performing means comprises:
    means for recording the telephone conversation;
    means, responsive to said first caller's preferences, for transmitting said recording to said first caller;
    means, responsive to said second caller's preferences, for transmitting said recording to said second caller.

13. The system of claim 8, wherein said performing means comprises:
    means for translating said telephone conversation into text;
    means, responsive to said first caller's preferences, for transmitting said text to said first caller;
    means, responsive to said second caller's preferences, for transmitting said text to said second caller.

14. The system of claim 8, wherein said transmitting means comprises means for sending said information via electronic mail.

15. The system of claim 1, further comprising means for updating said first and second callers' details.

16. A commuter program product comprising commuter program code stored on a computer readable storage medium, the program code comprising a system for, when executed on a computer, adding internet functionality to a telephone call as claimed in claim 1.

17. A carrier wave embodying computer program code, the program code comprising a system for, when executed on a computer, adding internet functionality to a telephone call as claimed in claim 1.

18. A method for adding internet functionality to a telephone call between a first caller and a second caller comprising:

responsive to receiving a source telephone number associated with said first caller and a destination telephone number associated with said second caller, extracting said numbers;

constructing a first query using said source number to access details relating to the first caller;

constructing a second query using said destination number to access details relating to the second caller;

retrieving said first and second callers details; and performing an internet related function while the first and second callers are connected in accordance with said details, wherein said details comprise preferences denoting the internet function to be performed.

* * * * *